United States Patent
Lee et al.

(10) Patent No.: US 8,524,384 B2
(45) Date of Patent: Sep. 3, 2013

(54) RECHARGEABLE BATTERY

(75) Inventors: Jae-Wook Lee, Yongin-si (KR);
Chi-Young Lee, Yongin-si (KR);
Gwan-Chan Jeon, Yongin-si (KR);
Myung-Jin Jeong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/285,366

(22) Filed: Oct. 31, 2011

(65) Prior Publication Data

US 2012/0214029 A1 Aug. 23, 2012

(30) Foreign Application Priority Data

Feb. 22, 2011 (KR) .................. 10-2011-0015731

(51) Int. Cl.
*H01M 10/52* (2006.01)
(52) U.S. Cl.
USPC ........................................... 429/53
(58) Field of Classification Search
None
See application file for complete search history.

(56) References Cited

U.S. PATENT DOCUMENTS

| 7,927,727 | B2 | 4/2011 | Kim et al. | |
|---|---|---|---|---|
| 2011/0183193 | A1* | 7/2011 | Byun et al. | 429/178 |
| 2011/0287291 | A1* | 11/2011 | Byun et al. | 429/94 |

FOREIGN PATENT DOCUMENTS

| JP | 2007-328940 A | 12/2007 |
|---|---|---|
| KR | 10-2000-0014969 A | 3/2000 |
| KR | 10-2004-0021309 A | 3/2004 |
| KR | 10 2005-01105 A | 11/2005 |
| KR | 10-2005-0121903 A | 12/2005 |
| KR | 10-2006-0011046 A | 2/2006 |
| KR | 10-2006-0125276 A | 12/2006 |

\* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A rechargeable battery including an electrode assembly, the electrode assembly including a positive electrode and a negative electrode; a case accommodating the electrode assembly; a cap plate coupled with the case; and a vent member welded to the cap plate, the vent member including a notch thereon, wherein a welded unit, by which the vent member and the cap plate are welded together, is separately formed toward a center of the cap plate in a thickness direction from an outer side of the cap plate so as to be spaced apart from the outer side of the cap plate.

10 Claims, 5 Drawing Sheets

RECHARGEABLE BATTERY

BACKGROUND

1. Field

Embodiments relate to a rechargeable battery.

2. Description of the Related Art

A rechargeable battery differs from a primary battery in that it can be repeatedly charged and discharged, while the primary battery makes the irreversible conversion of chemical to electrical energy and cannot be recharged. A low-capacity rechargeable battery may be used as a power supply for small electronic devices, e.g., cellular phones, notebook computers, and camcorders. A high-capacity rechargeable battery may be used as a power supply for, e.g., driving motors in hybrid vehicles and the like.

A prismatic-shaped rechargeable battery may include an electrode assembly (that has a positive electrode and a negative electrode with a separator interposed therebetween), a case (having a space housing or accommodating the electrode assembly), and a cap plate (that seals the case and has a terminal inserted therein). The terminal may be electrically connected with the electrode assembly and may protrude outside of the case.

A vent member (that is opened when an internal pressure of the rechargeable battery exceeds a predetermined pressure) may be installed on the cap plate. The vent member may be fixed to the cap plate by, e.g., welding.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly, the electrode assembly including a positive electrode and a negative electrode; a case accommodating the electrode assembly; a cap plate coupled with the case; and a vent member welded to the cap plate, the vent member including a notch thereon, wherein a welded unit, by which the vent member and the cap plate are welded together, is separately formed toward a center of the cap plate in a thickness direction from an outer side of the cap plate so as to be spaced apart from the outer side of the cap plate.

When a thickness of the cap plate is t1 and a distance between the welded unit and the cap plate outer side is h1, t1 and h1 may satisfy the relation: $0.1t1 \leq h1 \leq 0.5t1$.

The outer side of the cap plate may be a top side or a bottom side of the cap plate.

The cap plate may include an exhaust hole therein, and the vent member may be in the exhaust hole.

The exhaust hole may include a first step protruding therein at an upper part of the exhaust hole, and the welded unit may be on the first step.

The exhaust hole may include a second step at a lower part of the first step, the second step protruding further inside the exhaust hole than the first step, and the vent member may be supported by an upper end of the second step.

The exhaust hole may include a first step protruding inside the exhaust hole, and the vent member may include an inclined face on a side thereof, an end of the inclined face coinciding with the first step.

The welded unit may be on the end of the inclined face coinciding with the first step.

A first step protrudes inside the exhaust hole and is on a lower part of the exhaust hole, and the welded unit may be on the first step.

A second step protrudes further inside the exhaust hole than the first step, the second step being on an upper part of the first step, and the vent member may be supported by a lower end of the second step.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
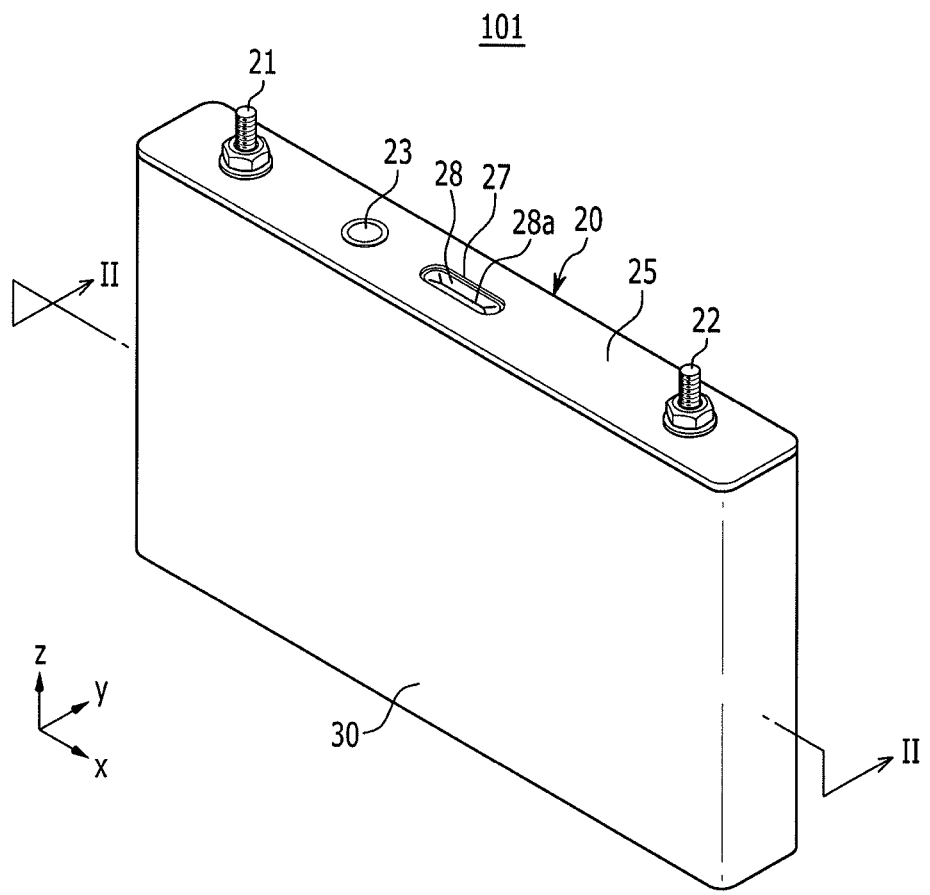
FIG. 1 illustrates a perspective view of a rechargeable battery according to an embodiment.

Korean Patent Application No. 10-2011-0015731, filed on Feb. 22, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
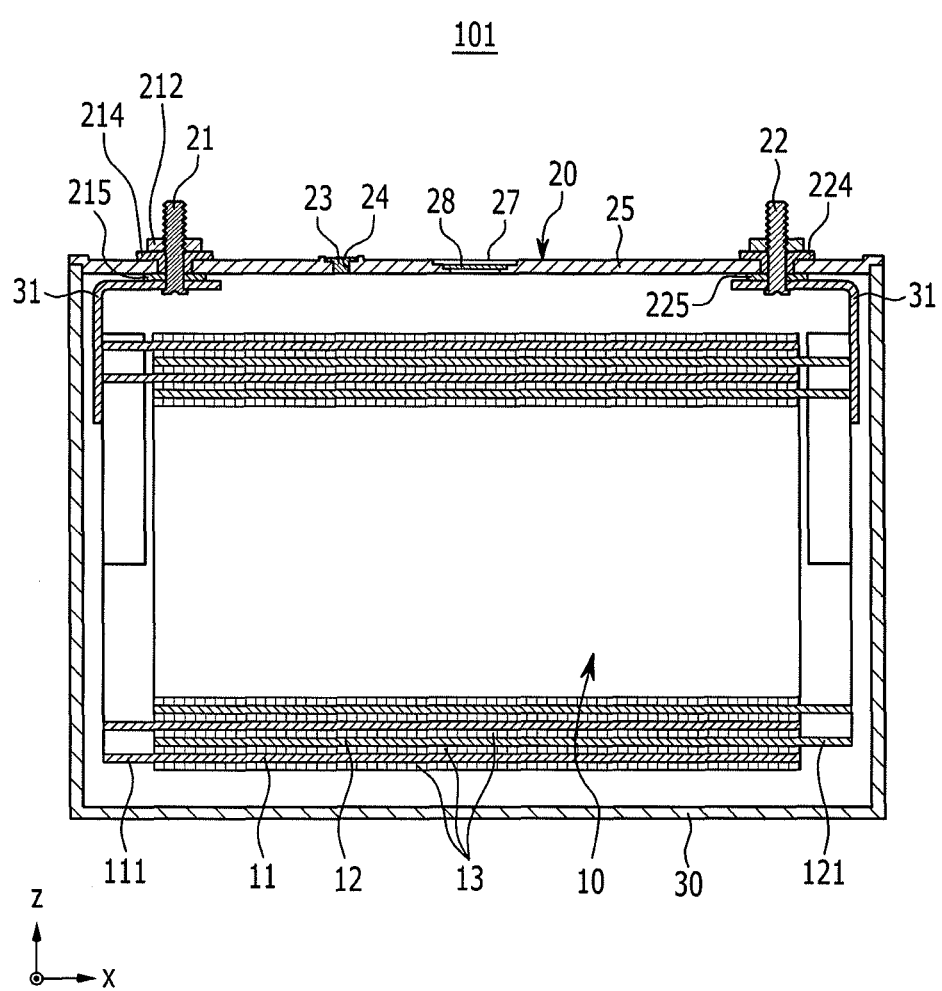
FIG. 2 illustrates a cross-sectional view with respect to an X-Z plane along a line II-II line of FIG. 1.

FIG. 1 illustrates a perspective view of a rechargeable battery according to an embodiment. FIG. 2 illustrates a cross-sectional view with respect to an X-Z plane and along a line II-II line of FIG. 1.

Referring to FIG. 1 and FIG. 2, a rechargeable battery 101 according to the present embodiment may include an electrode assembly 10 (in which a positive electrode 11 and a negative electrode 12 are wound with an insulating separator 13 interposed therebetween), a case 30 (accommodating the electrode assembly 10 therein), and a cap assembly 20 (coupled with an opening at one side of the case 30).

In an implementation, the rechargeable battery 101 may be a lithium ion rechargeable battery, which may have an angular or prismatic shape, and will be described as an example. However, the embodiments are not limited thereto, and the embodiments may be applied to batteries such as a lithium polymer battery, a cylindrical battery, and the like.

The positive electrode 11 and the negative electrode 12 may each include a current collector made of a thin metal foil and an active material on each current collector. Also, the positive electrode 11 and the negative electrode 12 may include a coated region (where the active material layer is formed on the current collector) and uncoated regions 111 and 121 (where the active material layer is not formed on the current collector).

The positive electrode uncoated region 111 may be formed at one side end of the positive electrode 11 (according to a length direction of the positive electrode 11); and the negative electrode uncoated region 121 may be formed at another side end of the negative electrode 12 (according to a length direction of the negative electrode 12). Also, the positive electrode 11 and the negative electrode 12 may be wound with the separator 13, e.g., an insulator, interposed therebetween.

However, the embodiments are not limited thereto; and the electrode assembly 10 may have a structure in which the positive electrode and the negative electrode (that are formed as a plurality of sheets) are stacked with the separator interposed therebetween.

The electrode assembly 10 may be formed into an approximate plate-like shape by being pressed after being wound. A plurality of electrode assemblies 10 may be erected and disposed for the uncoated regions 111 and 121 to be positioned at a side end inside the case 30.

The case 30 may form an entire exterior of the rechargeable battery 10. In an implementation, the case 30 may be made of a conductive metal, e.g., aluminum, an aluminum alloy, and/or nickel-plated steel. The case 30 may form a space for accommodating the electrode assembly 10. For example, the case 30 may have a rectangular parallelepiped angular shape having an opening at one end thereof to accommodate the electrode assembly 10 (having a shape corresponding to the rectangular parallelepiped). The opening may face an upper direction in the case 20 shown in FIG. 1 and FIG. 2.

The cap assembly 20 may include a cap plate 25 (covering the opening of the case 30), a positive electrode terminal 21 (protruding outside the cap plate 25 and electrically connected to the positive electrode 11), and a negative electrode terminal 22 (electrically connected to the negative electrode 12).

The cap plate 30 may be formed of a thin plate material and may be coupled with the opening of the case 20. A sealing cap 23 may be installed at an electrolyte solution inlet 24 in the cap plate 25; and a vent member 28 (having a notch 28a that opens at a predetermined pressure) may be installed at an exhaust hole 27 of the cap plate 25.

The positive electrode terminal 21 and the negative electrode terminal 22 may be installed by passing through the cap plate 25, and a nut 212 supported by a top part (of the respective terminal) may be coupled with the positive electrode terminal 21 and the negative electrode terminal 22.

In the present embodiment, the terminals 21 and 22 may be fixed by the nuts 212, but the embodiments are not limited thereto, and the terminals 21 and 22 may have, e.g., a rivet structure, or may be fixed through welding.

The positive electrode terminal 21 may be electrically connected to the positive electrode uncoated region 111 with a current collecting tab 31 as a medium. The negative electrode terminal 22 may be electrically connected to the negative electrode uncoated region 121 with a current collecting tab 31 as a medium.

An outer gasket 214 and an inner gasket 215 may be installed between the positive electrode terminal 21 and the cap plate 25 for insulation and sealing. Another outer gasket 224 and another inner gasket 225 may be installed between the negative electrode terminal 22 and the cap plate 25 for the same purpose.

Figure 3:
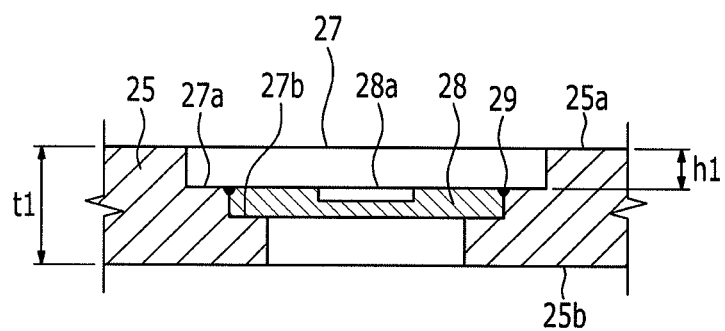
FIG. 3 illustrates a partial cross-sectional view of a cap plate and a vent member of the rechargeable battery of FIG. 1.

FIG. 3 illustrates a partial cross-sectional view of a cap plate and a vent member of the rechargeable battery of FIG. 1.

Referring to FIG. 3, the vent member 28 and the cap plate 25 according to the present embodiment will now be described.

The vent member 28 may have a plate shape and may be inserted into the exhaust hole 27 of the cap plate 25. The notch 28a may be formed on the vent member 28 so as to fracture when the internal pressure of the case 30 exceeds a predetermined pressure. The notch 28a may take various forms so that the vent member 28 may be swiftly or quickly opened.

A first step 27a (protruding inside the exhaust hole 27) may be formed at an upper part of the exhaust hole 27. A second step 27b (protruding further than the first step 27a) may be formed at a lower part of the first step 27a. When inserted into the first step 27a and supported by an upper end of the second step 27b, the vent member 28 may be welded to an upper end of the first step 27a.

A welded unit 29 (where the cap plate 25 and the vent member 28 are welded) may be separately disposed or spaced apart from an outer side of the cap plate 25. For example, the welded unit 29 may be separately disposed or spaced apart toward a center of the of the cap plate 25 (relative to a thickness direction of the cap plate 25 from the outer side of the cap plate 25).

When the thickness of the cap plate 25 is t1 and the distance of the welded unit 29 from the outer side of the cap plate 25 is h1, h1 satisfies Equation 1. Here, the outer side may be a top 25a and/or a bottom 25b of the cap plate 25.

$$0.1t1 \leq h1 \leq 0.5t1 \qquad \text{[Equation 1]}$$

Maintaining the separated distance h1 of the welded unit 29 at about 0.1 times the thickness t1 or greater may help reduce transformation or deformation of the cap plate 25 caused by the welding. Maintaining the separated distance h1 of the welded unit 29 at about 0.5 times the thickness t1 or less may help ensure that the separated distance of the cap plate 25 from the top 25a or bottom 25b of the cap plate is not greater than 0.5t1.

The welded unit 29 may be provided at a point that is about ⅓t1 distant from the top 25a of the cap plate 25 toward the center of the cap plate 25 (relative to the thickness direction thereof). When the first step 27a is opened toward the upper part in a like manner of the present embodiment, heat may be transferred in the lower direction of the cap plate 25 while the vent member 28 is welded, so the transformation or deformation may be minimized when the welded unit 29 is provided beyond the thickness center of the cap plate 25. The transformation or deformation may be minimized at the point where the separated distance h1 is ⅓t1.

According to the present embodiment, the welded unit 29 may be formed on the first step 27a and may be separately disposed or spaced apart from the top 25a of the cap plate 25 by the distance between the top of the cap plate and the first step 27a.

When the welded unit 29 is separately disposed or spaced apart toward the center from the outer side of the cap plate 25, transformation or deformation of the cap plate 25 may be minimized.

Figure 4A:
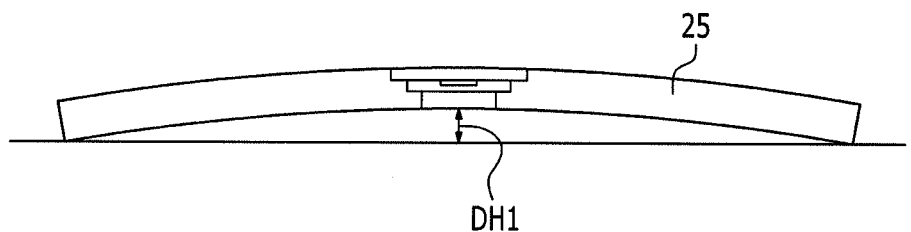
FIG. 4A illustrates a cross-sectional view of a cap plate according to an Example.
Figure 4B:
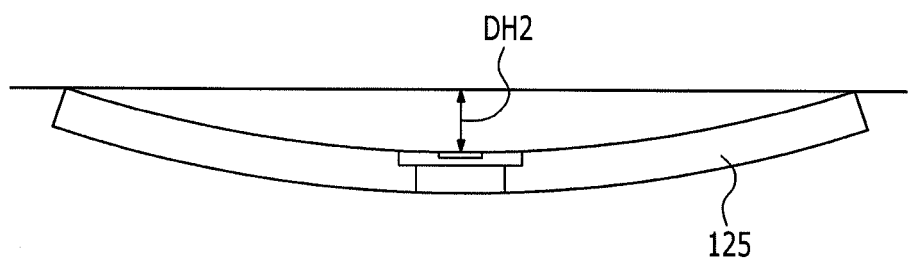
FIG. 4B illustrates a cross-sectional view of the cap plate according to a Comparative Example.

FIG. 4A illustrates a cross-sectional view of a cap plate of an Example, e.g., of an embodiment. FIG. 4B illustrates a cross-sectional view of a cap plate according to a Comparative Example.

On the cap plate 125 according to the Comparative Example, the welded unit may be formed on an outer side of the cap plate 125.

sure. The notch 42a may take on various shapes so that the vent member 42 may be quickly opened.

A first step 41a (protruding inside the exhaust hole 41) may be formed at the lower part of the exhaust hole 41. A second step 41b (protruding further inside the first step 41a) may be formed on an upper part of the first step 41a. The vent member 42 may be bonded on the upper end of the first step 41a by welding while it is inserted into the first step 41a and may be supported by the upper end of the second step.

A welded unit 45 (where the cap plate 40 and the vent member 42 are welded) may be separately disposed or spaced

TABLE 1

| Sample | Sample 1 | Sample 2 | Sample 3 | Sample 4 | Sample 5 | Sample 6 | Sample 7 | Sample 8 | average | Sample 9 |
|---|---|---|---|---|---|---|---|---|---|---|
| Maximum Displacement | 0.11 | 0.17 | 0.156 | 0.102 | 0.155 | 0.159 | 0.116 | 0.137 | 0.15 | 0.346 |

Table 1 shows absolute values of maximum displacements of a cap plate according to an Example and a Comparative Example.

Referring to FIG. 3, FIG. 4A, and Table 1, when the welded unit 29 was formed near a center (relative to the thickness direction of the cap plate 25) and the cap plate 25 was contracted by heat, deformation thereof was relatively reduced because only the center of the cap plate 25 was contracted.

As shown in FIG. 4B, when the welded unit 29 was formed on the outer side of the cap plate 125, the cap plate 125 was deformed to a relatively greater degree because the portion thereof that is contracted by the heat during welding is separated from the center of the cap plate 125 in the thickness direction.

Regarding Table 1, the Samples 1 to 8 indicate the maximum displacement DH1 of the cap plate 25 according to the Example, and the Sample 9 indicates the maximum displacement DH2 of the cap plate 125 according to the Comparative Example. As expressed in Table 1, the maximum displacement DH2 of the cap plate 125 according to the Comparative Example was 0.346 mm; and the average maximum displacement DH1 of the cap plate 25 according to the Example was 0.15 mm, e.g., about half that of the Comparative Example.

The cap plate 25 according to the Example was transformed in the opposite direction of the cap plate 125 according to the Comparative Example. This is because the welded unit 29 was near the center of the cap plate 25 and much of the heat was transferred to the lower part of the cap plate 25.

According to the embodiments, the transformation or deformation caused by welding the vent member 28 and the cap plate 25 may be minimized. When the cap plate 125 is severely deformed (as in the Comparative Example) the case 30 and the cap plate may not be stably coupled.

Figure 5:
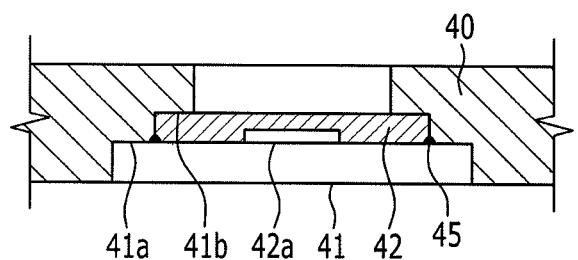
FIG. 5 illustrates a partial cross-sectional view of a cap plate of a rechargeable battery and a vent member according to another embodiment.

FIG. 5 illustrates a partial cross-sectional view of a cap plate of a rechargeable battery and a vent member according to another embodiment.

Referring to FIG. 5, the rechargeable battery has the same configuration as the rechargeable battery according to the previous embodiment except for the configuration of a cap plate 40 and a vent member 42. Thus, a repeated descriptions of similar elements will be omitted.

An exhaust hole 41 may be formed on the cap plate 40; and the vent member 42 (on which a notch 42a is formed) may be fixed in the exhaust hole 41 by welding. The vent member 42 may have a plate shape and may be inserted in the exhaust hole 41 of the cap plate 40. The notch 42a may be formed in the vent member 42 so that it may be fractured when the internal pressure of the case exceeds a predetermined presapart from the outer side of the cap plate 40. For example, the welded unit 45 may be separately disposed or spaced apart toward the center of the cap plate 40 (relative to the thickness direction from the bottom of the cap plate 40). The welded unit 45 may be formed on the upper end of the first step 41a, and may be separately disposed or spaced apart from the bottom of the cap plate 40 by a distance or height of the first step 41a. The vent member 42 may be separately disposed or spaced apart from the bottom of the cap plate 40, so welding may be performed such that laser beams may be input to the bottom of the cap plate 40. In this case, the heat caused by welding may be transferred to the top from the bottom of the cap plate 40.

Figure 6:
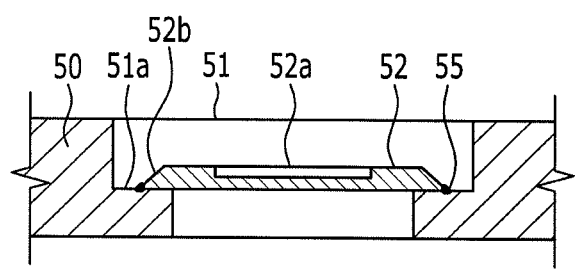
FIG. 6 illustrates a partial cross-sectional view of a cap plate of a rechargeable battery and a vent member according to yet another embodiment.

FIG. 6 illustrates a partial cross-sectional view of a cap plate of a rechargeable battery and a vent member according to yet another embodiment.

Referring to FIG. 6, the rechargeable battery according to the present embodiment has the same configuration as the rechargeable battery according to the previous embodiment except for the structure of a cap plate 50 and a vent member 52. Thus, a repeated description of similar elements is omitted.

An exhaust hole 51 may be formed on the cap plate 50; and the vent member 52 (on which a notch 52a is formed) may be fixed to the exhaust hole 51 by welding. The vent member 52 may have a plate shape and may be inserted into the exhaust hole 51. The notch 52a may be formed on the vent member 52 so that it may be fractured when the internal pressure of the case exceeds a predetermined pressure. The notch 52a may take on various shapes so that the vent member 52 may be swiftly or quickly opened.

A first step 51a (protruding inside the exhaust hole 51) may be formed in the exhaust hole 51. When inserted into the first step 51a, the vent member 52 may be coupled with an upper end of the first step 51a by welding.

The vent member 52 may include an inclined face 52b on a side thereof. For example, the inclined face 52b may be formed along the side of the vent member 52. The vent member 52 may be coupled with the first step 51a by welding at the side of the inclined face 52b. A welded unit 55 (at which the cap plate 50 and the vent member 52 are welded) may be separately disposed or spaced apart from the center of the cap plate 50 in a thickness direction from an outer side of the cap plate 50.

According to the present embodiment, the welded unit 55 may be formed on the first step 51a and may be separately disposed on or spaced apart from the top of the cap plate 50 by a distance between the first step 51a and the top of the cap plate 50. The welded unit 55 may be separately formed or spaced apart from the outer side of the cap plate 50 without forming the second step.

By way of summation and review, when the vent member and the cap plate are welded, the cap plate may be bent because of contraction caused by heat. In order to prevent this phenomenon, the cap plate may be made thick. However, when the thickness of the cap plate is increased, production cost may also increase and the weight of the rechargeable battery may also increase, thereby reducing output per unit weight. When the cap plate is bent, the bent cap plate may be repaired by using an additional tool so as to couple the cap plate with the case, during which the vent member may be damaged because of stress applied to the vent member.

Thus, the embodiments provide a rechargeable battery exhibiting reduced deformation of a cap plate.

According to an embodiment, the bending phenomenon of the cap plate may be reduced. For example, the part on which the vent member and the cap plate are welded may be separately disposed toward a center of the cap plate in a thickness direction, relative to the outer part of the cap plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly, the electrode assembly including a positive electrode and a negative electrode;
a case accommodating the electrode assembly;
a cap plate coupled with the case, the cap plate having an inner surface that faces an interior of the rechargeable battery and having an outer surface parallel to the inner surface and facing away from the interior of the rechargeable battery; and
a vent member welded to the cap plate, the vent member:
including a notch thereon,
having an inner surface that faces an interior of the rechargeable battery, and
having an outer surface parallel to the inner surface and facing away from the interior of the rechargeable battery,
wherein:
a welded unit, by which the vent member and the cap plate are welded together, is separately formed toward a center of the cap plate in a thickness direction from the inner surface or the outer surface of the cap plate so as to be spaced apart from the inner surface or the outer surface of the cap plate, and
the inner surface of the vent member is spaced apart from the inner surface of the cap plate and the outer surface of the vent member is spaced apart from the outer surface of the cap plate.

2. The rechargeable battery as claimed in claim 1, wherein, when a thickness of the cap plate is t1 and a distance between the welded unit and the inner surface or outer surface of the cap plate is h1, t1 and h1 satisfy the relation: $0.1t1 \leq h1 \leq 0.5t1$.

3. The rechargeable battery as claimed in claim 2, wherein the welded unit is separately formed toward a center of the cap plate in a thickness direction from the inner surface and the outer surface of the cap plate so as to be spaced apart from the inner surface and the outer surface of the cap plate.

4. The rechargeable battery as claimed in claim 1, wherein:
the cap plate includes an exhaust hole therein, and
the vent member is in the exhaust hole.

5. The rechargeable battery as claimed in claim 4, wherein:
the exhaust hole includes a first step protruding therein at an upper part of the exhaust hole, and
the welded unit is on the first step.

6. The rechargeable battery as claimed in claim 5, wherein:
the exhaust hole includes a second step at a lower part of the first step, the second step protruding further inside the exhaust hole than the first step, and
the vent member is supported by an upper end of the second step.

7. The rechargeable battery as claimed in claim 4, wherein:
the exhaust hole includes a first step protruding inside the exhaust hole, and
the vent member includes an inclined face on a side thereof, the inclined face being inclined with respect to the inner surface and the outer surface of the vent member and an end of the inclined face coinciding with the first step.

8. The rechargeable battery as claimed in claim 7, wherein the welded unit is on the end of the inclined face coinciding with the first step.

9. The rechargeable battery as claimed in claim 1, wherein:
a first step protrudes inside the exhaust hole and is on a lower part of the exhaust hole, and
the welded unit is on the first step.

10. The rechargeable battery as claimed in claim 9, wherein:
a second step protrudes further inside the exhaust hole than the first step, the second step being on an upper part of the first step, and
the vent member is supported by a lower end of the second step.

* * * * *